US012704325B2

United States Patent
(12) United States Patent
Bashiri

(10) Patent No.: US 12,704,325 B2
(45) Date of Patent: Aug. 11, 2026

(54) LOW-TEMPERATURE, EJECTOR ASSISTED DRYER APPARATUS, METHODS AND DEPLOYMENT THEREOF

(71) Applicant: Her Majesty The Queen In Right of Canada as Represented by the Minister of Natural Resources, Ottawa (CA)

(72) Inventor: Hamed Bashiri, Saint-Lambert (CA)

(73) Assignee: HER MAJESTY THE QUEEN IN RIGHT OF CANADA AS REPRESENTED BY THE MINISTER OF NATURAL RESOURCES, Ottawa (CA)

( * ) Notice: Subject to any disclaimer, the term of this patent is extended or adjusted under 35 U.S.C. 154(b) by 512 days.

(21) Appl. No.: 18/551,494

(22) PCT Filed: Mar. 14, 2022

(86) PCT No.: PCT/CA2022/050372
§ 371 (c)(1),
(2) Date: Sep. 20, 2023

(87) PCT Pub. No.: WO2022/198302
PCT Pub. Date: Sep. 29, 2022

(65) Prior Publication Data

US 2024/0175630 A1 May 30, 2024

Related U.S. Application Data

(60) Provisional application No. 63/166,001, filed on Mar. 25, 2021.

(51) Int. Cl.
*F26B 23/00* (2006.01)
*F26B 5/04* (2006.01)
(Continued)

(52) U.S. Cl.
CPC .............. *F26B 23/002* (2013.01); *F26B 5/04* (2013.01); *F26B 17/08* (2013.01); *F26B 21/452* (2026.01);
(Continued)

(58) Field of Classification Search
CPC ...... F26B 2200/02; F26B 21/452; F26B 3/06; F26B 5/04
See application file for complete search history.

(56) References Cited

U.S. PATENT DOCUMENTS

2020/0208335 A1* 7/2020 Chudnovsky ........... D06F 58/48

FOREIGN PATENT DOCUMENTS

CN 111174556 A 5/2020

OTHER PUBLICATIONS

ISR and WO received in PCT/CA2022/050372 on Jun. 24, 2022.

* cited by examiner

*Primary Examiner* — Ngoc T Nguyen
(74) *Attorney, Agent, or Firm* — Daniel C. Pierron; Widerman Malek, PL

(57) ABSTRACT

The invention discloses method and system of drying renewable sources of energy and raw material. The drying process is carried out under partial vacuum conditions and at lower temperatures than conventional dryers. The temperature to dry the material and the rate of water removal are controlled by regulating the degree of vacuum and the intensity of heat input. A method for drying material to moisture content below 10% by weight, comprises introducing into an ejector a stream with a pressure above ambient pressure, creating partial vacuum in a drying chamber through the secondary nozzle of the ejector when the stream enters the ejector and provides the motive pressure to the primary nozzle of the ejector, said drying chamber having an inlet into which a wet
(Continued)

material is introduced and an outlet for taking out the dried material after the drying treatment, drying the wet material using low temperature waste heat.

19 Claims, 8 Drawing Sheets

(51) Int. Cl.
*F26B 17/08* (2006.01)
*F26B 21/45* (2026.01)

(52) U.S. Cl.
CPC ....... *F26B 2200/02* (2013.01); *F26B 2200/18* (2013.01)

LOW-TEMPERATURE, EJECTOR ASSISTED DRYER APPARATUS, METHODS AND DEPLOYMENT THEREOF

CROSS-REFERENCE TO RELATED APPLICATION

The present non-provisional patent application claims the benefit of and priority to U.S. Provisional Patent Application No. 63/166,001, filed Mar. 25, 2021.

FIELD OF THE INVENTION

The present invention relates to the field of environmentally friendly and energy efficient low-temperature drying apparatus.

BACKGROUND OF THE INVENTION

Due to growing concerns about resource independence and promoting economic growth for local areas, drying materials, such as solid fuels and food, has recently gained significant interest.

As an example, there is growing worldwide interest in using biomass as an alternative fuel and raw material due to environmental and economic incentives such as securing a clean energy supply that provides energy independence, significant environmental benefits due to reduced greenhouse gas emissions, and promoting positive economic growth.

The term "biomass" refers to both energy crops (plants grown to be used as a fuel) and waste or by-products, such as municipal and other agricultural, commercial and industrial wastes, forestry residues and sawdust, to name a few. As used herein, the term "biomass" refers to woody biomass such as forest residue and bark.

The moisture content of biomass is typically high and often varies between 50 and 65% depending on the season, climate, and the type of biomass. Generally speaking, when wet biomass uses either as fuel in boiler or as a raw material in a gasifier, part of the energy input is consumed to evaporate the water content within the wet biomass. The heat needed to evaporate 1 kg of water content from the wet biomass fuel can surpass 2.6 MJ depending on the initial and final moisture content and temperature of the wet biomass. In the case of wet biomass combustion in a boiler, the flame temperature can drop (from ~1300° C. to 980°) C., which reduces the efficiency of heat transfer.

In contrast, dry biomass can be used in a smaller sized boiler which requires lower capital investment due to improvement of heat transfer efficiency. Moreover, combustion process of dry biomass is more complete due to higher flame temperatures, which can result in lower production of carbon monoxide and fly ash leaving the boiler. As such, the downstream facility that handles the environmental footprint can also be smaller (i.e., lower capital investment) and improved efficiency.

To prevent smoke formation, 80% excess air is recommended for combustion of wet biomass, whereas for dry biomass fewer than 30% excess air can be used which leads to lower production of waste heat. Moreover, fans (forced or induced) that provide the air circulation in the boiler consume less energy and reduce the requirement for ancillary power.

Overall, using dry biomass can substantially improve boiler or gasifier thermal efficiency and the quality of the final product from processes such as pulp & paper and bio-refinery. Moreover, dropping the moisture content of biomass to 10-15% is a prerequisite for other downstream processes such as pyrolysis or gasification units. Biomass drying can also significantly reduce transportation cost. In addition, dry bio-fuels are less prone to microbiological degradation.

Therefore, reducing the moisture content of the biomass to an optimum value is required in both economic and environmental point of views.

There are many commercially available dryers that can handle specific types of material to be dried. Selection of a dryer for biomass depends on many factors, such as the characteristics of the feedstock, capital, operational and maintenance costs, environmental emission, fire hazards, energy efficiency, and the potential for utilizing waste heat.

Mainstream dryer technologies commonly used for biomass are: (1) rotary drum, (2) belt/conveyer, (3) cascade/fluidized bed, (4) flash/pneumatic. Other types of dryer that are not widely used in industry are open air drying; perforated floor bin drying, electromagnetic radiation (microwave), disc dryer, screw heat exchanger, and tray dryer.

The limitations and drawbacks of current drying technology are summarized in Table 1.

TABLE 1

Drawbacks of mainstream biomass dryers.

| Rotary drum | Belt/conveyer |
|---|---|
| Very energy intensive<br>High level of VOC emissions<br>Very expensive<br>Great fire hazard<br>No opportunity for utilizing waste heat | High residual moisture content<br>Large environmental footprint<br>Low operating capacity<br>High capital, operating and maintenance costs<br>Tar build-up issues |
| **Cascade/Fluidized bed** | **Flash/pneumatic** |
| High operating and maintenance costs<br>Tar/fine build-up issue<br>Segregation of biomass particles and defluidization<br>Difficulties in heat recovery | Limited to small particles<br>High installation cost<br>High electricity and heat requirements<br>Great chance of corrosion |

In commercial designs of industrial dryers, hot drying medium or heating sources, such as steam and high temperature flue gas, are often used in order to make drying operation economically viable. However, this approach poses a formidable challenge in commercial implementation for drying heat-sensitive and combustible materials. Moreover, it has been proven that high-temperature drying of organic material leads to significant volatile organic compounds (VOCs) emissions as can be seen in FIG. 1 (See K. Svoboda, J. Martinec, M. Pohorely, and D. Baxter, "Integration of biomass drying with combustion/gasification technologies and minimization of emissions of organic compounds," *Chem. Pep*, vol. 63, no. 1, pp. 15-25, Feb. 2009, doi: 10.2478/s11696-008-0080-5). This in turn increases the total cost of the whole system by several folds as installing an end-of-pipe cleaning unit is inevitable. Thus, dealing with these challenges has been always a source of concern for industry, which has in turn curbed the market penetration of high-temperature drying technologies.

In existing prior art, drying can alternatively be accomplished at low-temperature operating condition. Few vendors market this type of dryer such as DRY-REX™ technology developed by Thermal Energy International Inc. This low-temperature system minimizes the amount of volatile organic compounds and reduces the risk of fires or explosions in the case of drying organic and combustible materials, respectively. The system can preferably operate on waste heat from a variety of commercial and industrial sources.

The off-the-shelve low-temperature dryers, however, had a bad reputation in the industry due to their large footprint and consequently high investment requirements. A significant amount of electrical power is required to circulate the drying medium through the system.

Moreover, the final moisture content of material often cannot be reduced below 15-20%. However, this value for moisture content is not suitable for some downstream processes such as pyrolysis or gasification units. Therefore, an extra drying module equipped with high temperature heating source (such as steam) is required in order to further reduce the moisture content of the material for such applications.

Vacuum pumps were also used in conventional low temperature dryers for drying specialty products and fine chemicals (e.g., in pharmaceutical industry).

However, the conventional low temperature dryers using vacuum pumps have the following disadvantages:

(1) the vacuum pumps are heavy and need a well-designed structure;
(2) the vacuum pumps need to be further equipped with additional accessories such as water and oil supply and draining pipes;
(3) such systems cannot handle particulates;
(4) such systems are costly;
(5) such systems generate severe vibration and noise; and
(6) such systems require significant electrical power for operation.

Due to all these shortcomings, using vacuum pump for high throughput drying is impractical.

Therefore, based on at least the above disadvantages, engineers are often reluctant to implement the conventional low-temperature dryers which utilize waste heat, even though waste heat is certainly a large untapped energy source available at industrial sites.

Therefore, there remains the need for environmentally friendly and energy efficient low-temperature drying apparatus using waste heat.

SUMMARY OF THE INVENTION

According to the present invention, an environmentally friendly and energy efficient low-temperature drying apparatus using waste heat is disclosed.

According to one aspect of the invention, there is provided method for drying material to moisture content below 10% by weight, comprising:

introducing into an ejector a stream with a pressure above ambient pressure, creating partial vacuum in a drying chamber connected to the ejector through the secondary nozzle of the ejector when the stream enters the ejector and provides the motive pressure to the primary nozzle of the ejector, wherein said drying chamber having an inlet into which a wet material is introduced therein by a feeding means and an outlet for taking out the dried material after the drying treatment, drying the wet material using low temperature waste heat.

According to another aspect of the invention, there is provided a system for drying material to moisture content below 10% by weight, comprising:

an ejector wherein a stream with a pressure above ambient pressure enters the ejector and provides the motive pressure to the primary nozzle of the ejector, partial vacuum in a drying chamber connected to an ejector through the secondary nozzle of the ejector is created, wherein said drying chamber having an inlet into which a wet material is introduced therein by a feeding means, and wherein an outlet for taking out the dried material after drying treatment by a waste heat under low temperature.

According to an embodiment of the present invention, the low temperature is between 25° C. and 100° C., and more preferably in 60° C. to 90° C. range.

According to an embodiment of the present invention, the partial vacuum is between 0.1 bara to 0.9 bara and more preferably in 0.3-0.6 bara range.

According to an embodiment of the present invention, a waste-heat valorization system is used to condition motive flow of the ejector.

According to an embodiment of the present invention, a waste-heat valorization system is used to condition drying medium and/or drying energy source.

According to an embodiment of the present invention, a condenser is used to remove condensable gases before being sent to the suction of the ejector.

According to an embodiment of the present invention, the wet material is introduced to the drying chamber, and/or after drying taken out of the drying chamber, by a conveyor means.

According to an embodiment of the present invention, the conveyor means is a seal screw conveyers or lock hopper.

According to an embodiment of the present invention, the materials to be dried comprises woody biomass, agricultural biomass, plant-based biomass, lignocellulosic materials, pulp, lignin, sludge, agricultural and commercial waste, food, feed, and pharmaceutical products, etc.

According to the present invention, a heat recovery steam generator is used to convert preheated water to superheated steam using a waste heat source. Any high-temperature off-gases that are often available in industrial units such as boilers can be used as an energy source in the heat recovery steam generator. The superheated steam then enters into an ejector and provides the motive pressure to the primary nozzle of the ejector which creates a partial vacuum in a drying chamber connected to the ejector through the secondary nozzle of the ejector. The drying chamber has an inlet into which the wet material is introduced to the chamber by a feeding means and an outlet for taking out the dried material after the drying treatment. The outlet of the ejector is a mix of water vapor and air (the drying medium) at medium temperature and pressure. This stream is used to preheat fresh water for steam generation in the heat recovery steam generator and to heat up the drying medium (cold air) using two separate heat exchangers, respectively.

A booster pump delivers fresh water to the heat recovery steam generator unit in a pressure required for steam generation. The drying medium (heated air) at low temperature is sucked into the drying chamber by the secondary nozzle of the ejector.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein.

DETAILED DESCRIPTION OF THE INVENTION

It is to be understood that the disclosure is not limited in its application to the details of the embodiments as set forth in the following description. The invention is capable of other embodiments and of being practiced or of being carried out in various ways. By way of example only, preferred embodiments of the present invention are described hereinafter with reference to the accompanying drawings.

Furthermore, it is to be understood that the terminology used herein is for the purpose of description and should not be regarded as limiting. Any numerical range recited herein is not intended to include all values from the lower value to the upper value of that range. Contrary to the use of the term "consisting", the use of the terms "including", "containing", "comprising", or "having" and variations thereof is meant to encompass the items listed thereafter and equivalents thereof as well as additional items. The use of the term "a" or "an" is meant to encompass "one or more". Any numerical range recited herein is intended to include all values from the lower value to the upper value of that range.

The term "low-temperature" refers to the temperature below 100° C. The temperature range for this invention is between 25° C. and 100° C., and preferably in the range of about 60° C. to about 90° C.

The term "partial vacuum" refers to pressure range between 0.1 to 1 bara. The partial vacuum in this invention is in the range between 0.1 bara to 0.9 bara, and preferably in the range of about 0.3 bara to about 0.6 bara.

The terms "dryer" and "drying chamber" are used interchangeably.

The present invention discloses a cost-effective, energy-efficient, and environmentally friendly technology that addresses the critical shortcomings of mainstream dryers.

The dryer disclosed herein operates at low temperatures and by way of increasing energy efficiency of the drying process when utilizing low-grade waste heat largely available from industrial processes.

Moreover, high-temperature pre-treatment is not preferred because it may affect the final product such as fuel and chemicals production, for example, from ligno-cellulosic biomass.

The present invention discloses method and system of drying renewable sources of energy and raw material such as woody biomass, forest residue and municipal and industrial waste that can be used to produce added-value chemicals. This targets many industrial sectors such as pulp and paper, chemical and fertilizers. In addition, its use may extend beyond the above-mentioned materials and cover a much wider range of applications, as a person skilled in the art would understand.

According to the present invention, the drying process is carried out under partial vacuum conditions and at lower temperatures than conventional dryers. The temperature to dry the material and the rate of water removal are controlled by regulating the degree of vacuum and the intensity of heat input.

Figure 1:
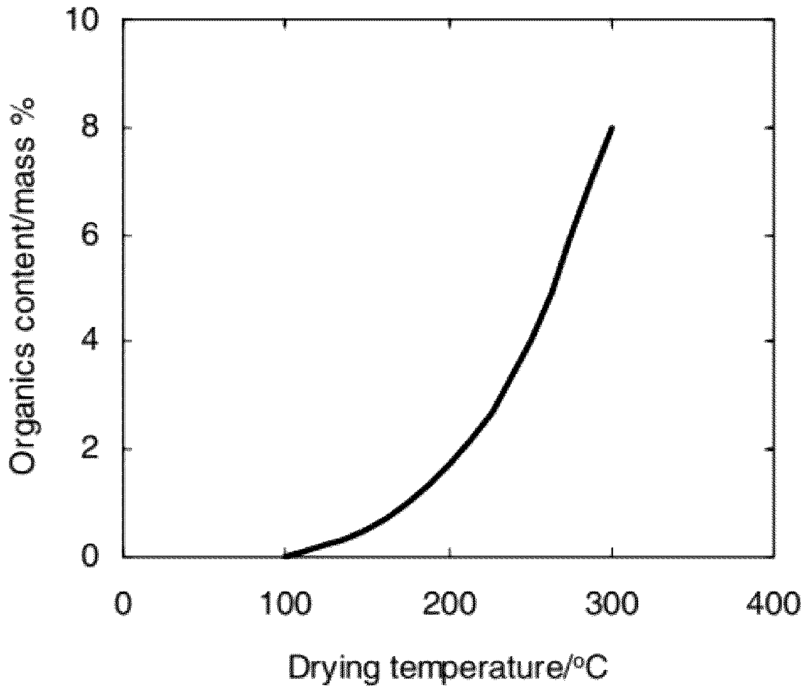
Figure 1 PRIOR ART
FIG. 1 is a graph of temperature dependence of total amount (mass %, dry basis) of organic compounds released in atmospheric drying of biomass.
Figure 2:
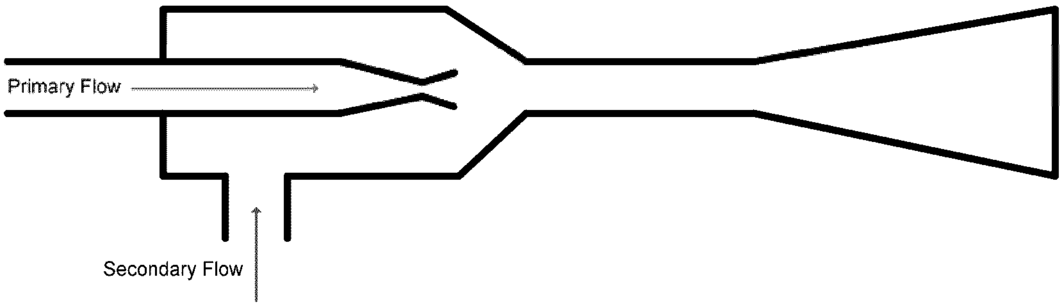
Figure 2 PRIOR ART
FIG. 2 is a diagram of a typical ejector (jet pump) of prior art.

Ejectors, or jet pumps, utilize the pressure energy of a high-pressure fluid stream to boost the pressure and/or flow of a low-pressure source. They can operate with either incompressible or compressible fluids as the primary (driving) and secondary (driven) flows. The main features of an ejector are shown in FIG. 2. The primary fluid is passed through a nozzle where the pressure energy is converted into kinetic energy. The high-velocity jet entrains the secondary fluid. The two streams mix in the mixing tube, leading to pressure recovery. Further static pressure is recovered in a narrow-angle diffuser downstream of the mixing tube.

As such, ejectors, or jet pumps, are used to create the partial vacuum due to their reliability and economic viability compared to vacuum pumps. As noted above, ejectors operate based on the principle of interaction between two fluid streams at different energy levels. The primary or motive stream, in the form of gas or liquid, has higher total energy level, while the secondary or driven stream has lower total energy level. The mechanical energy transfer from the primary stream to the secondary stream imposes a compression effect on the secondary stream.

Even though the overall efficiency of ejectors or jet pumps is generally lower than alternative technologies such as mechanical compressors, they have the advantages such as simplicity in design and construction with no moving parts, and low manufacturing and maintenance costs. The main advantage of ejector or jet pumps is the possibility to recover waste heat or capitalize on thermodynamic inefficiencies of the process as motive energy to operate while saving high quality energy.

In contrast, vacuum pumps are heavy and need a well-designed structure, and they normally need to be further equipped with accessories such as water and oil supply and draining pipes. Among their disadvantages, vacuum pumps also cannot handle particulates, they are costly, and they generate severe vibration and noise.

The proposed invention provides apparatus, arrangement and methods of use that aim to dry material in cost-effective and energy-efficient manner. This invention is suited to exploit waste-heat recovery opportunities as it operates at lower temperatures.

The present invention discloses the use of ejectors or jet pumps activated by any type of waste heat or any type of extra available process stream that flows at elevated pressure (i.e., P>Ambient pressure).

The available waste heat can also heat-up any available and compatible flow that provides the required energy for the drying processes and removes the produced water vapor. The available waste heat may also be used directly as a drying medium if it does not impose any constraint to the final product.

For example, when a dryer is used to dry a biomass in a pulp and paper mill, various sources of waste heat (for example, boiler flue gases, evaporators, condenser, smelt dissolving tank, lime mud, lime kiln flue gas, caustic plant, white liquor, digester, bleaching plant, turbine and pulp dryer exhaust) can be utilized directly, or upgraded using waste heat valorization technology (such as heat pumps), or used to operate ejectors or jet pumps used for vacuum production.

Also, when a dryer is used to a dry biomass in a paper or pulp & paper mill, various source of surplus process stream flow at elevated pressure (e.g., LP, MP and HP steams that have to be vented, compressed air and high pressure liquid, etc.) can be used as motive flows for the ejectors or jet pumps to produce a partial vacuum.

The ejectors or jet pumps used to generate a partial vacuum may be single or multiple one phase, or two-phase; and the fluid used for activating the ejectors or jet pumps may comprise single or multiple components.

The vessel or chamber in which partial vacuum is regulated can receive the wet material which to be dried in a continuous or batch-wise fashion. The vessel or chamber can be thermally insulated. In a continuous system, the vessel or chamber may comprise conveying belt or chains.

The level of partial vacuum is regulated by means of ejector and/or control valve(s) depending on the type and the quality of the wet material to be dried and the available waste heat in order to optimize and speed up the drying process.

When the process disclosed in the present invention is used to dry a biomass, it can eliminate the volatile organic compounds (VOCs) emissions completely as it operates below 100° C.

The dryer shortens the retention time of the material inside the dryer significantly due to reduced drying time which leads to more compact systems and with, consequently, lower capital and operating expenditure and therefore lower payback periods.

The present invention provides a method for drying material to moisture content of below 10% (by weight) using only waste heat and in a single-step process unit.

Figure 3:
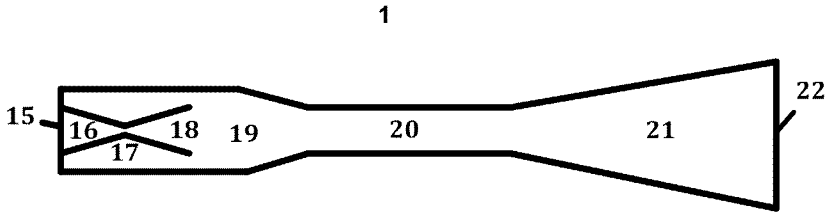
FIG. 3 is a partial sectional view of an ejector (jet pump) according to an embodiment of the present invention.

FIG. 3 shows a sectional partial view of an ejector 1. The motive fluid delivered to the ejector at inlet 15 is expanded through either a converging 16—diverging 18, or only a converging nozzle 16 to a high velocity and low pressure stream. This high velocity and low-pressure stream entrains the suction fluid through suction nozzle 17. The motive and suction fluids are then mixed in the mixing section that comprises secondary nozzle section 19 and constant or non-constant cross-section area 20. Afterwards, the high-speed mixed flow is then decelerated in a diffuser 21 and static pressure is recovered, resulting in an intermediate pressure 22 provided to the suction stream across the ejector.

Figure 4:
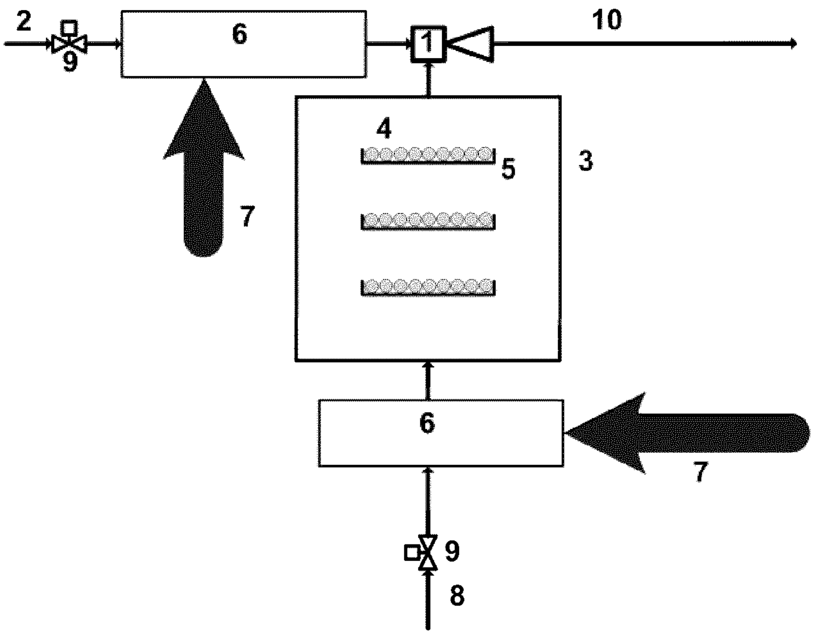
FIG. 4 is a schematic of a process flow scheme according to an embodiment of the present invention for a batch-wise process.

FIG. 4 is a schematic of a process flow scheme according to an embodiment of the present invention for a batch-wise process.

FIG. 4 shows a schematic of an embodiment according to the present invention where ejector 1, activated by a relatively high pressure stream 2, is used to create a partial vacuum and also to regulate the operating pressure of a pressure-resistant drying chamber 3 where wet material 4 is being dried in a batch-wise process. Perforated plates or mesh or other similar means 5 can be used to hold the wet material 4 and provide contact area for mass and heat transfer. A waste-heat 7 valorization system 6 is used in order to condition the motive flow of the ejector and/or as a heat source that is used to provide the required energy for the drying process. In a batch-wise process, the drying chamber 3 has an inlet into which the wet material 4 is introduced to the drying chamber 3 and an outlet for taking out the dried material after treatment (not shown). The outlet can be, for example, a door that may be closed, or a handwheel that ensures the required operating conditions of the system. The input and output to the drying chamber 3 can alternatively use the same door.

This system can advantageously include a programming control means that may comprise a microprocessor unit (not shown), which is operationally and functionally connected to pressure sensor(s) (not shown) that monitors the operating pressure inside the system.

The control strategy can be obtained by, for example, using regulating valves 9 for injecting fluids into the system, or by regulating the level of vacuum inside the system using the ejector 1. The regulating valves 9 also can be used to control the mass flow of the motive flow of the ejector 1.

According to an embodiment of the present invention, the available waste heat 7 can also heat-up indirectly any available and compatible flow 8, such as air, that provides the required energy for the drying process and removes the water vapor produced.

The mixed flow comprising water vapor, non-condensable and condensable gases, drying medium and motive flow 10 of ejector 1 are then sent to downstream process units such as check valves, separators, knock out drums, waste water treatment, etc. (not shown).

The waste-heat valorization system may comprise a single heat exchanger, a heat pump system, or various combinations of both, that valorize low-grade waste heat to condition the motive flow of the ejector and/or provide the required energy for the drying process.

Referring to FIGS. 3 and 4, when a gas ejector(s) or jet pump(s) is used, the motive gas is accelerated in the primary nozzle 16 where it reaches supersonic velocity, creating a depression at the nozzle outlet 18, and drawing the secondary flow coming from the drying chamber 3 at a lower pressure. Both flows enter in contact before reaching the constant cross-section area 20 of the mixing chamber of the ejector 1, where the two velocities equalize at a constant pressure and a series of shock waves occur, accompanied by a significant pressure rise, while the velocity decreases to become sub-sonic. Afterwards, the flow enters the diffuser 21, where the flow further slows down and allows for the conversion of the remaining velocity into static pressure and the mixed flow reaches the intermediate pressure 22 between primary and secondary flow pressure.

When a liquid-gas ejector(s) or jet pump(s) is used, the motive fluid enters into the nozzles 15, 16 at a relatively high pressure. Reduction of the pressure of the liquid in the nozzle 16 provides the potential energy for conversion to kinetic energy of the liquid. The driving flow entrains the vapor and the drying medium out of the pressure-resistant drying chamber 3. The liquid and vapor phases mix in the mixing chamber 19, 20 and then leave the mixing chamber after a recovery of pressure in the diffuser 21. As a result, a two-phase mixture of intermediate pressure 22 is obtained that can be injected to the downstream process vessels and equipment such as check valves, knock-out drums or separators.

The ejector(s), or jet pump(s) may comprise a single ejector jet pump (either gas or liquid-gas ejector) or a plurality of gas and/or liquid-gas ejectors jet pump(s). It can be operationally located according to the intended end use and operational environment of the system, and can be located in series, in parallel, or a combination thereof.

When the motive flow of the ejector is not sufficient or not at the required pressure level, booster pump, compressors or fans can be used along with ejectors in order to enhance the performance of the system.

Figure 5:
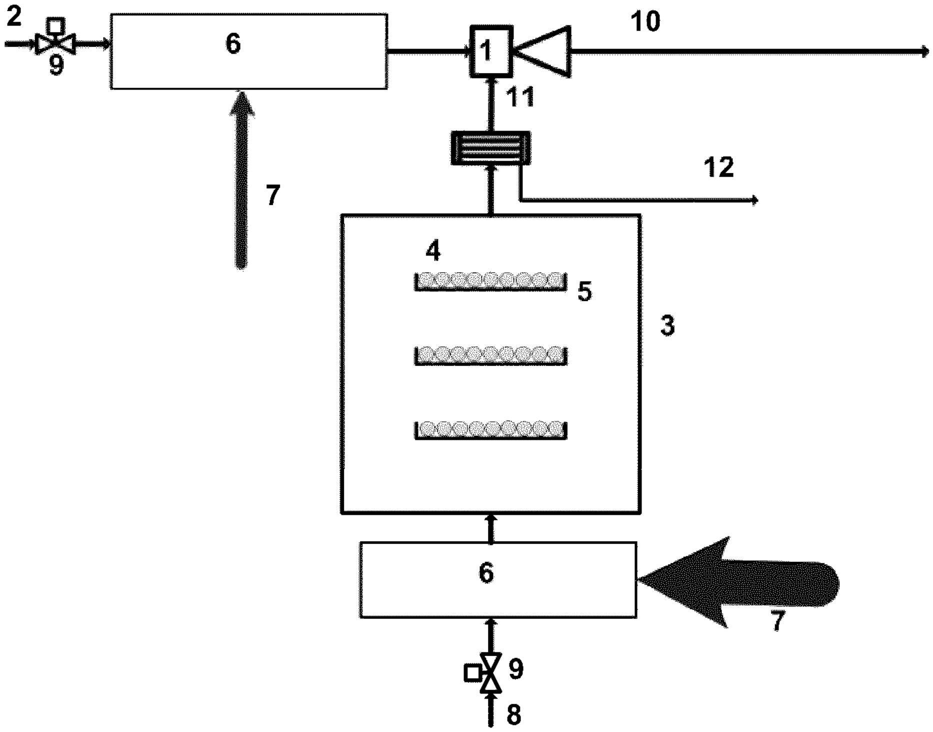
FIG. 5 is a schematic of a process flow scheme according to an embodiment of the present invention for a batch-wise process in which condenser(s) are used to downsize the ejector(s) or jet pump(s).

FIG. 5 is a schematic of a process flow scheme according to an embodiment of the present invention for a batch-wise process in which condenser(s) are used to downsize the ejector(s) or jet pump(s).

In contrast to the embodiment as shown in FIG. 4, in FIG. 5, a condenser 11, such as surface or direct-contact condenser, is used to remove condensable gases such as water vapor 12 before being sent to the suction of ejector 1. By this strategy, the required motive mass flow for producing the same level of partial vacuum and the size of the ejector decrease substantially. The mixed flow, comprising water vapor, non-condensable gas, the drying medium and the motive flow of the ejector 1, is sent to downstream process units such as check valves, separators, knock out drums, waste water treatment, etc.

Figure 6:
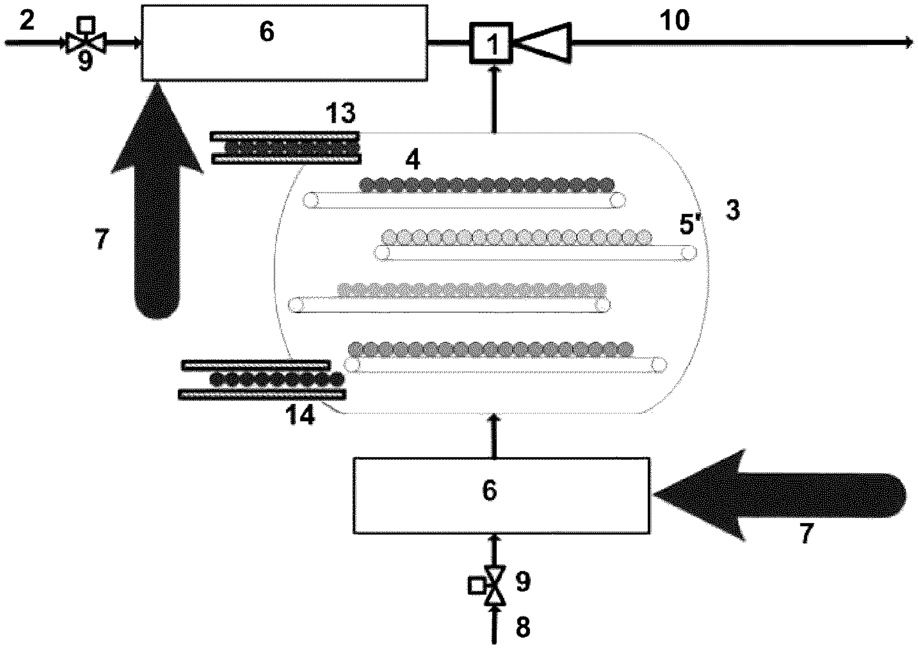
FIG. 6 is a schematic of a process flow scheme according to an embodiment of the present invention for a continuous process.

FIG. 6 is a schematic of a process flow scheme according to an embodiment of the present invention for a continuous process.

In contrast to the embodiment as shown in FIG. 4, in FIG. 6, an internal perforated conveying system 5', such as a chain or belt or other similar means, is used to hold and carry the material and provide contact area for mass and heat transfer. In the continuous process, the drying chamber 3 has an inlet through which the wet material 4 is introduced into the drying chamber 3 by a feeding means 13 and an outlet for taking out the dried material after treatment by a conveyor means 14. The feeding/conveyor means can be achieved, for example, by using seal screw conveyers or lock hoppers that ensure the required operating conditions of the system.

Figure 7:
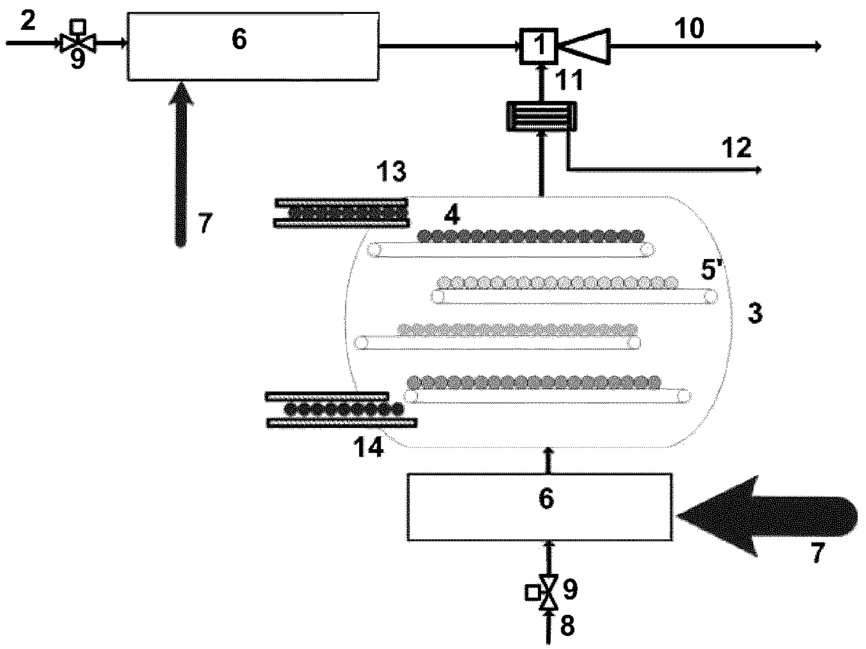
FIG. 7 is a schematic of a process flow scheme according to an embodiment of the present invention for a continuous process in which condenser(s) are used to downsize the ejector(s) or jet pumps(s).

FIG. 7 is a schematic of a process flow scheme according to an embodiment of the present invention for a continuous process in which condenser(s) are used to downsize the ejector(s) or jet pumps(s).

In contrast to the embodiment as shown in FIG. 6, in FIG. 7, a condenser 11, such as surface or direct-contact condenser, is used to remove condensable gases such as water vapor 12 before being sent to the suction of ejector 1. By this strategy, the required motive mass flow for producing the same level of partial vacuum and the size of the ejector decrease substantially. The mixed flow, comprising water vapor, non-condensable gas, the drying medium and the motive flow of the ejector 1, is sent to downstream process units such as check valves, separators, knock out drums, waste water treatment, etc.

Figure 8:
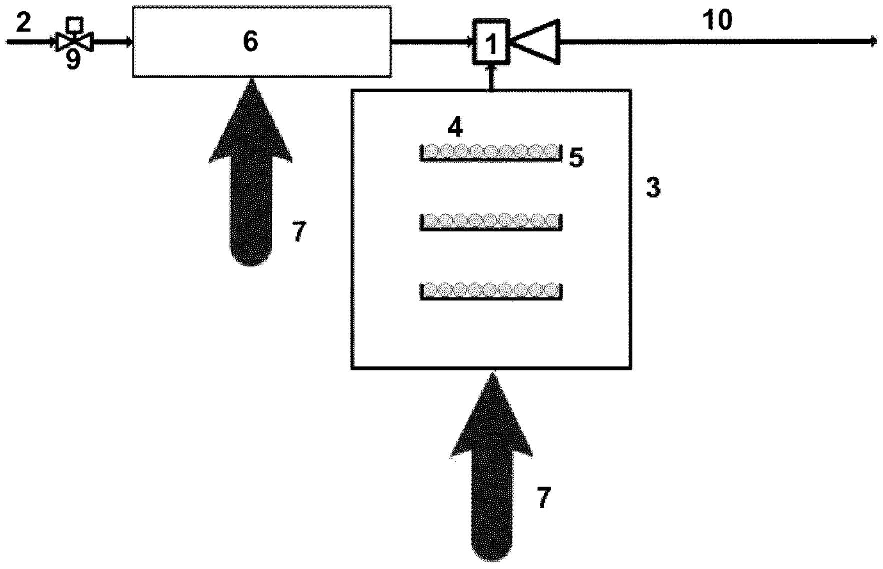
FIG. 8 is a schematic of a process flow scheme according to an embodiment of the present invention (for example, for a batch-wise process) in which a compatible waste heat source is used as a drying medium and/or drying energy source.

FIG. 8 is a schematic of a process flow scheme according to an embodiment of the present invention (for example, for a batch-wise process) in which a compatible waste heat source is used as a drying medium and/or drying energy source.

In contrast to the embodiment as shown in FIG. 4, in FIG. 8, the available waste heat 7, such as boiler flue gas, can be used directly or indirectly to provide the required energy for drying processes and/or as a drying medium to remove the produced water vapor.

Figure 9:
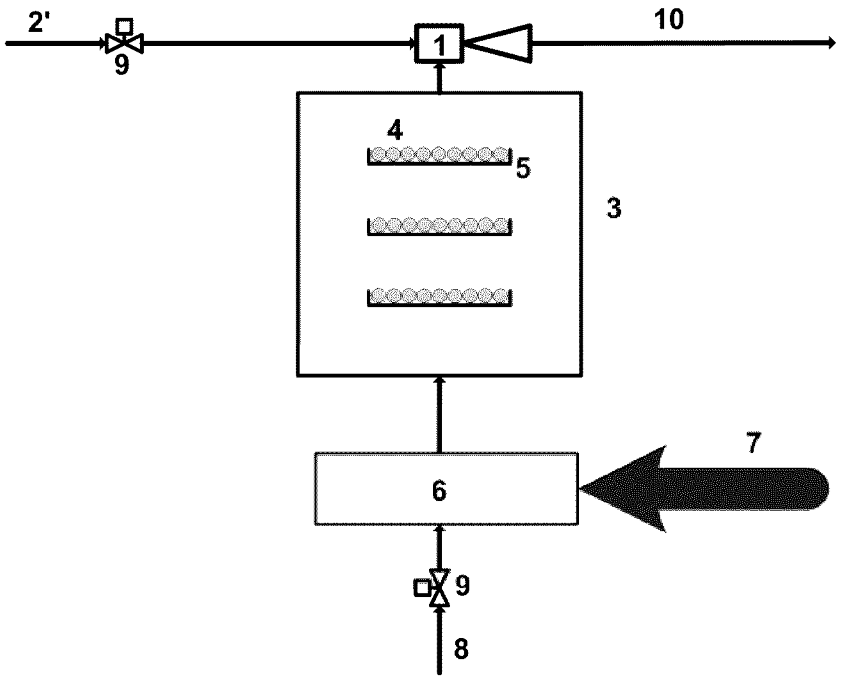
FIG. 9 is a schematic of a process flow scheme according to an embodiment of the present invention (for example, for a batch-wise process) in which any extra steam or process stream with elevated pressure is used to activate the ejector or jet pump.

FIG. 9 is a schematic of a process flow scheme according to an embodiment of the present invention (for example, for a batch-wise process) in which any extra steam or process stream with elevated pressure is used to activate the ejector or jet pump.

FIG. 9 shows a schematic of an embodiment according to the present invention where ejector 1, activated by a relatively high-pressure stream 2', is used to create a partial vacuum and also to regulate the operating pressure of a pressure-resistant drying chamber 3 where wet material 4 is being dried in a batch-wise process. The available relatively high-pressure stream 2' can be a LP, MP and HP steam, compressed air or any high pressure liquid. In contrast to the embodiment as shown in FIG. 4, no waste-heat valorization system is used to condition the motive flow of the ejector.

Figure 10:
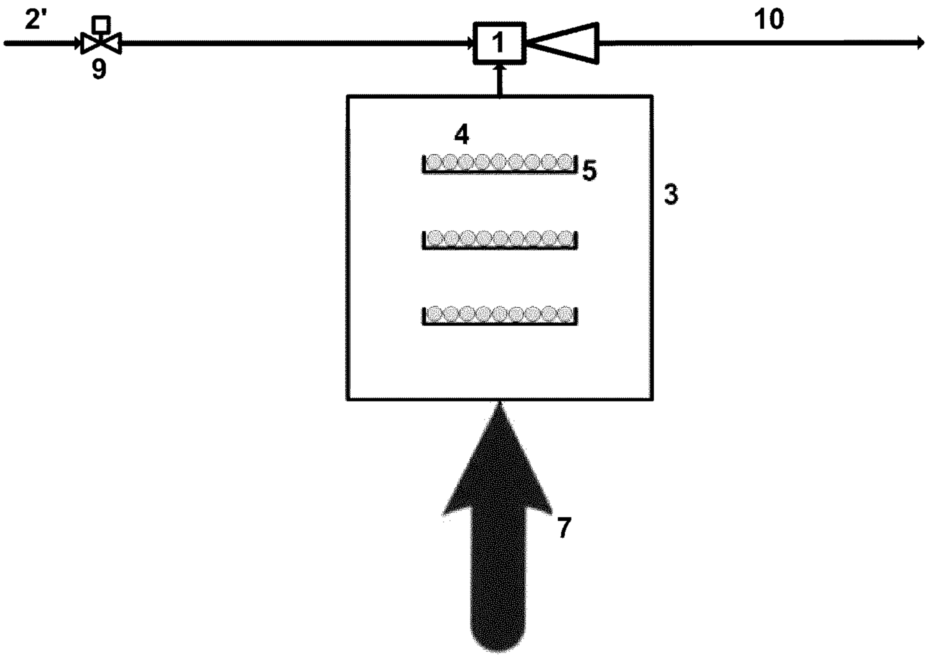
FIG. 10 is a schematic of a process flow scheme according to an embodiment of the present invention (for example, for a batch-wise process) in which any extra steam or process stream with elevated pressure is used to activate the ejector or jet pump and a compatible waste heat source is used as a drying medium and/or drying energy source.

FIG. 10 is a schematic of a process flow scheme according to an embodiment of the present invention (for example, for a batch-wise process) in which any extra steam or process stream with elevated pressure is used to activate the ejector or jet pump and a compatible waste heat source is used as a drying medium and/or drying energy source.

In contrast to the embodiment as shown in FIG. 9, in FIG. 10, the available and waste heat 7, such as boiler flue gas, can be used directly or indirectly to provide the required energy for drying processes and/or as a drying medium to remove the produced water vapor.

Regarding FIGS. 8 to 10, these figures illustrate schematically the embodiments according to the present invention in a batch process. However, a person skilled in the art would understand that in each of these embodiments, the batch drying process can be replaced by a continuous process. Moreover, condensers can be used advantageously in the embodiments shown in FIGS. 8 to 10 to remove the condensable gases form the secondary stream of ejector(s) in order to decrease the motive flow requirement and to downsize the employed ejector.

Regarding FIGS. 4 to 10, these figures illustrate schematically the use of a single ejector. However, a person skilled in the art would understand that the single ejector shown in these figures can be replaced by a plurality of ejectors, installed in series or in parallel, or combinations thereof.

In some cases, the condenser can be used to remove the condensable gases form the secondary stream of ejector(s) in order to decrease the motive flow requirement. A person skilled in the art would understand that configurations and internal geometries of ejectors are variously selected to maximize the combinations of characteristics available to the particular system.

Figure 11:
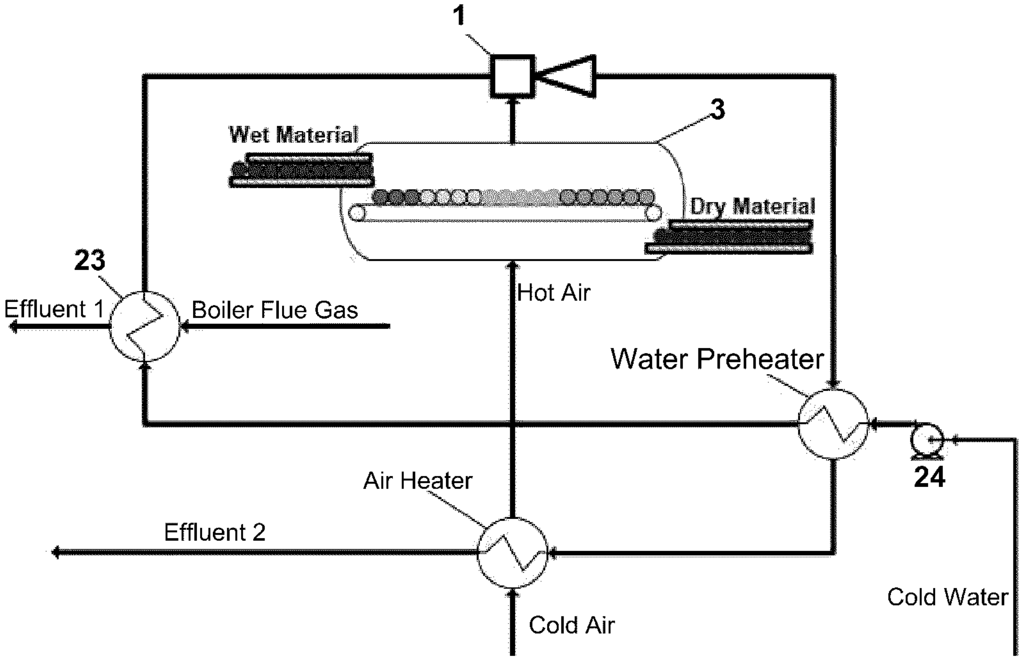
FIG. 11 is a diagram of an embodiment of a low-temperature, ejector assisted dryer apparatus according to the present invention.

FIG. 11 illustrates an embodiment according to the present invention where an ejector, which is activated by relatively high-pressure steam, is used to create a partial vacuum inside a pressure-resistant drying chamber where material is being dried in a continuous process.

Referring to FIG. 11, a heat recovery steam generator (HRSG) 23 is used to convert preheated water to superheated steam using a waste heat source.

Any high-temperature off-gases that are often available in industrial units such as boilers can be used as an energy source in the heat recovery steam generator.

A drying chamber 3 is connected to the secondary nozzle of the ejector 1. The superheated steam then enters the ejector 1 and provides the motive pressure to the primary nozzle of the ejector 1 that creates a partial vacuum in the drying chamber 3 through the secondary nozzle of the ejector 1.

The internal perforated conveying system such as a chain or belt or other type of means inside the drying chamber 3 can be used to hold and carry the material and provide contact area for mass and heat transfer. In the continuous process, the drying chamber 3 has an inlet into which the wet material is introduced to the chamber 3 by a feeding means and an outlet for taking out the dried material after the drying treatment. This can be achieved, for example, by using seal screw conveyors or lock hoppers that ensure the required operating conditions of the system.

A waste-heat valorization system, acting as a heat recovery steam generator, is used in order to produce steam as a motive flow of the ejector. The ejector creates a partial vacuum environment in the drying chamber through the secondary nozzle of the ejector. The outlet of the ejector is a mix of water vapor and air (the drying medium) at medium temperature and pressure. This stream is used to preheat fresh water for steam generation in the heat recovery steam generator 23 and to heat up the drying medium (cold air) using two separate heat exchangers, respectively. A booster pump 24 delivers fresh water to the heat recovery steam generator 23 in a pressure required for steam generation. The drying medium (heated air) at low temperature is sucked into the drying chamber 3 by the secondary nozzle of the ejector.

Therefore, waste heat source (e.g., boiler flue gas) is used to create partial vacuum environment inside the drying chamber 3 using the ejector 1 while the remaining energy in this waste heat stream is used to heat up the required air as a low-temperature drying medium and to preheat the water required for steam generation.

The system can advantageously include a programming control means that may comprise a microprocessor unit (not shown in FIG. 11), which is operationally and functionally connected to pressure sensors (not shown in FIG. 11) that monitors the operating pressure inside the system.

The control strategy can be further obtained by, for example, using regulating valves (not shown in FIG. 11) for injecting the drying medium into the drying chamber 3 or by regulating the level of vacuum inside the drying chamber 3 using the ejector 1. These valves can also be used to control the mass flows of streams that go to the drying chamber.

The efficiency of the system can be optimized by carefully selecting ejector geometry as well as the pressure of motive steam and the drying chamber.

Moreover, various configurations of the ejector, including parallel, and in series, can be considered.

The low temperature ejector assisted dryer apparatus and system which use waste heat as a source of energy, is therefore a better alternative to the conventional low-temperature dryers.

The present invention is therefore able to address the chief challenges of conventional low-temperature dryers that use waste heat as a source of energy for industrial implementation.

More precisely, the required residence time of material to reach specific final moisture content according to the present invention is lower compared to that of the conventional low-temperature dryers. This means that the present invention has smaller footprint compared to the conventional low-temperature dryers for a specific throughput and consequently requires lower capital expenditure.

Moreover, the present invention works chiefly using waste energy while the prior art conventional low-temperature dryers largely rely on the use of electricity as high-quality source of energy. Therefore, the present invention has lower operating expenditure compared to that of the conventional low-temperature dryers.

In addition, in contrast to the conventional low-temperature dryers, the present invention can achieve decreasing the moisture content of material to a very low value, which is an essential prerequisite of many downstream processes.

The main advantages of using the ejector to create partial vacuum in the drying chamber are the ability to recover waste heat and capitalize on the thermodynamic inefficiencies of the process as motive energy to operate while saving high quality energy (i.e., electricity), this is in contrast to the existing conventional low-temperature dryers which use vacuum pumps.

Figure 12:
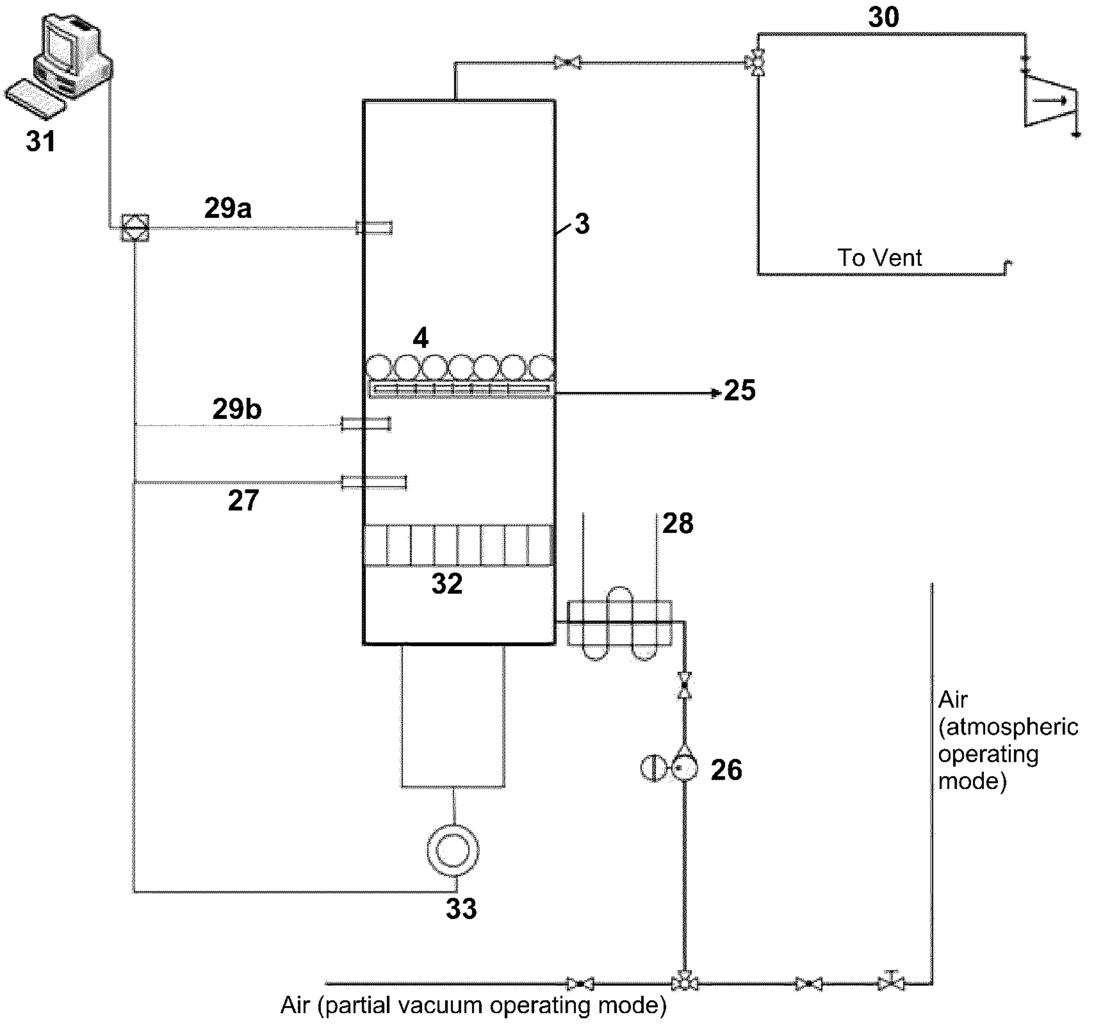
FIG. 12 is a depiction of an operationally flexible drying chamber.

FIG. 12 is a schematic drawing of an operationally flexible drying chamber that is designed and built to conduct comparative analysis of drying performance under operation condition of the present invention as well as conventional low-temperature hot air dryers.

Referring to FIG. 12, in the drying chamber 3, a holder 25 (for example, a perforated plate), on which material is spread, is placed inside a pipe where air (drying medium) is blown from a gas diffuser 32. Volumetric flow rate and temperature of this airflow are measured using a mass flowmeter 26 and a thermocouple 27. The temperature of airflow going to the drying chamber 3 is automatically controlled using a heating element 28 (for example, an electrical heating element).

The operating pressure of the drying chamber 3 is measured and monitored using two pressure sensors (29*a*/29*b*) that are located below and above the holder 25 in the drying chamber 3. A vacuum production device 30 is used to impose the operating conditions of this invention (partial vacuum) inside the drying chamber 3. The material 4 spread on the holder 25 is continuously weighted with a precision balance or weighting scale 33 connected to a computer 31 and the data is registered. The experiments last between 60 and 180 minutes, depending on the targeted operating conditions. The experiments ended when the material on the holder reach a constant mass (equilibrium moisture content), as measured by the precision balance. For all the drying experiments, the weight of material spread on the holder is recorded every 10 seconds.

Each drying experiment consists of the following sequential steps (the experimental protocol):

1. The material sample initial moisture content is determined beforehand using oven dry moisture analyzer experiments;
2. Chamber heating: the airflow and the heater are switched on to get steady-state conditions in the drying chamber;
3. The partial vacuum production device/or air blower and the heater are switched off while placing the material sample in the chamber and spreading them on the perforated plate (the holder);

4. Start of convective airflow flux with the desired velocity and temperature and then start of weighting measurement;
5. End of measurements: shut down heating resistance and airflow and removing the material; and
6. The biomass sample final moisture content is determined using oven dry moisture analyzer experiments.

The unique design of the set-up as depicted in FIG. 12 allows the measurement of drying rate of material at operating conditions of the present invention versus that of the conventional low temperature dryers.

Figure 13:
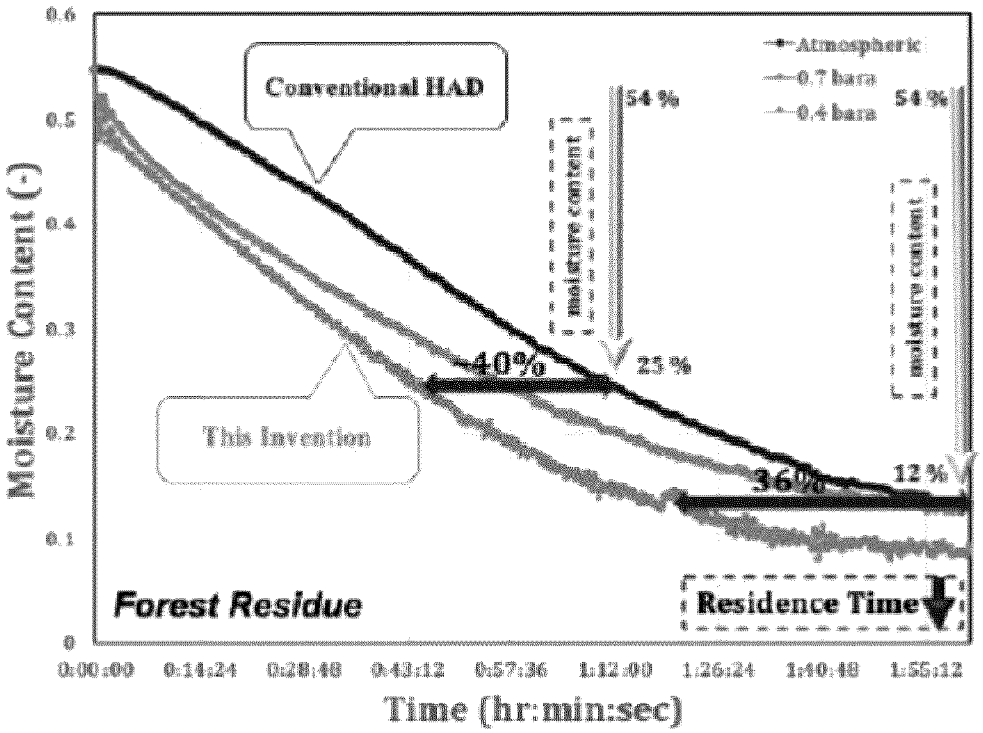
FIG. 13 is a graph of time evolution of the moisture content of the forest residue under operating conditions of the invention versus a conventional low temperature dryer.

FIG. 13 shows the evolution of the measured moisture content by time under operation condition of a conventional air dryer and the present invention.

The performance of drying forest residues according to the present invention was compared to that by using the conventional low-temperature hot air dryer.

All experimental data shown in FIG. 13 were obtained at drying chamber temperature of 70° C. and the same standard volumetric flow of drying medium.

FIG. 13 shows that the present invention reduces the moisture content of forest residue in a significantly shorter time period compared to that by the conventional low temperature dryers.

A comparative techno-economic assessment is also performed in order to appreciate the advantages and to demonstrate economical attractiveness of this invention. An example of application of the method and the apparatus according to the present invention is provided below:

Example

It has been found that using the present invention, as opposed to a conventional low temperature dryer, to dry 260 (bone dry kg)/hr of forest residues (from 54 to 10% moisture content) in an industrial facility leads to at least USD 8 million savings in the presumed lifetime of the system (i.e., 20 years) due to lower estimated capital expenditure and operating expenditure requirements.

Therefore, the drying apparatus according to the present invention is more energy efficient and environmentally friendly than the existing conventional low temperature dryers.

Although the present invention has been described in considerable detail with reference to certain preferred embodiments thereof, other embodiments and modifications are possible. Therefore, the scope of the appended claims should not be limited by the preferred embodiments set forth in the examples but should be given the broadest interpretation consistent with the description as a whole.

The invention claimed is:

1. A method for drying material to moisture content below 10% by weight, comprising:
- introducing into an ejector a stream with a pressure above ambient pressure,
- creating partial vacuum in a drying chamber connected to the ejector through a secondary nozzle of the ejector when the stream enters the ejector and provides a motive pressure to a primary nozzle of the ejector,
  - wherein said drying chamber having an inlet into which a wet material is introduced therein by a feeding means and an outlet for taking out dried material after the drying treatment,
- drying the wet material using low temperature waste heat.

2. The method according to claim 1, wherein the low temperature is between 25° C. and 100° C., and preferably in 60° C. to 90° C. range.

3. The method according to claim 1, wherein the partial vacuum is between 0.1 bara to 0.9 bara and preferably in 0.3-0.6 bara range.

4. The method according to claim 1, wherein a waste-heat valorization system is used to condition motive flow of the ejector.

5. The method according to claim 1, wherein a waste-heat valorization system is used to condition drying medium and/or drying energy source.

6. The method according to claim 1, wherein a condenser is used to remove condensable gases before being sent to the suction of the ejector.

7. The method according to claim 1, wherein the wet material is introduced to the drying chamber, and/or after drying taken out of the drying chamber, by a conveyor means.

8. The method according to claim 7, wherein the conveyor means is a seal screw conveyers or lock hopper.

9. The method according to claim 1, wherein the wet material comprises at least one of woody biomass, agricultural biomass, plant-based biomass, lignocellulosic materials, pulp, lignin, sludge, agricultural and commercial waste, food, feed, and pharmaceutical products.

10. A system for drying material to moisture content below 10% by weight, comprising:
- an ejector wherein a steam with a pressure above ambient pressure enters the ejector and provides a motive pressure to a primary nozzle of the ejector, partial vacuum in a drying chamber connected to an ejector through a secondary nozzle of the ejector is created,
  - wherein said drying chamber having an inlet into which a wet material is introduced therein by a feeding means, and
  - an outlet for taking out the dried material after drying treatment by a waste heat under low temperature.

11. The system according to claim 10, wherein the low temperature is between 25° C. and 100° C., and preferably in 60° C. to 90° C. range.

12. The system according to claim 10, wherein the partial vacuum is between 0.1 bara to 0.9 bara and preferably in 0.3-0.6 bara range.

13. The system according to claim 10, wherein a waste-heat valorization system is used to condition motive flow of the ejector.

14. The system according to claim 10, wherein a heat recovery steam generator using a waste heat is used to convert a preheated water to the steam with the pressure above ambient pressure.

15. The system according to claim 10, wherein a waste-heat valorization system is used to condition drying medium and/or drying energy source.

16. The system according to claim 10, wherein a condenser is used to remove condensable gases before being sent to the suction of the ejector.

17. The system according to claim 10, wherein the wet material is introduced to the drying chamber, and/or after drying taken out of the drying chamber, by a conveyor means.

18. The system according to claim 10, wherein the feeding means is a seal screw conveyers or lock hopper.

19. The system according to claim 10, wherein the wet material comprises at least one of woody biomass, agricultural biomass, plant-based biomass, lignocellulosic materials, pulp, lignin, sludge, agricultural and commercial waste, food, feed, and pharmaceutical products.

* * * * *